United States Patent [19]

Eck et al.

[11] Patent Number: 5,210,162

[45] Date of Patent: May 11, 1993

[54] PROCESS FOR POLYMERIZING POLAR COMPOUNDS

[75] Inventors: Herbert Eck, Burghausen; Gerald Fleischmann, Emmerting; Kunigunde Kolbig, Gumpersdorf; Alfred Prasse, Burghausen, all of Fed. Rep. of Germany

[73] Assignee: Wacker-Chemie GmbH, Munich, Fed. Rep. of Germany

[21] Appl. No.: 814,224

[22] Filed: Dec. 23, 1991

Related U.S. Application Data

[63] Continuation of Ser. No. 530,143, May 29, 1990, abandoned, which is a continuation-in-part of Ser. No. 186,989, Apr. 27, 1988, abandoned.

[30] Foreign Application Priority Data

Apr. 30, 1987 [DE] Fed. Rep. of Germany ....... 3714563
Oct. 2, 1987 [DE] Fed. Rep. of Germany ....... 3733314

[51] Int. Cl.$^5$ ............................................. C08F 4/16
[52] U.S. Cl. .................................. 526/192; 526/194; 526/329.7
[58] Field of Search ......................... 526/190, 192, 194

[56] References Cited

U.S. PATENT DOCUMENTS 4,771,117 9/1988 Citron et al. ..................... 526/194
4,822,859 4/1989 Sogah ................................. 526/194
4,940,760 7/1990 Boettcher et al. ................. 526/190

*Primary Examiner*—Joseph L. Schofer
*Assistant Examiner*—David Wu

[57] ABSTRACT

A process for polymerizing polar compounds which have a C=C double bond in an $\alpha$-position relative to a carbonyl or nitrile group, such as acrylic acid derivatives, which comprises polymerizing the polar compounds in the presence of organometallic compounds of silicon, germanium or tin as initiators together with a nucleophilic or electrophilic catalyst at temperatures in the range of from $-100°$ C. to $+100°$ C. The initiators used in the quasi-ionic polymerization are selected from group (I) consisting of cyclic silazanes, polymeric silazanes which contain more than two silazanyl groups per molecule, cyclic siloxanes and polymeric siloxanes which contain more than two siloxanyl groups per molecule and at least one Si-bonded hydrogen atom and silanes having at least one Si-bonded N atom in the form of secondary or tertiary amido groups or at least one Si-bonded carbon atom in the form of alkynyl or cyclodienyl groups for each Si atom, or group (II) consisting of silanes having at least three silyl groups per molecule, germanes, stannanes or siloxanes, germoxanes or stannoxanes, in which at least one metal-bonded hydrocarbyloxy group is present for each metal atom.

4 Claims, No Drawings

PROCESS FOR POLYMERIZING POLAR COMPOUNDS

This is a continuation application of Ser. No. 07/530,143 filed May 29, 1990, and now abandoned, which was a continuation-in-part application of Ser. No. 07/186,989 filed Apr. 27, 1988 and now abandoned.

The present invention relates to a process for polymerizing polar compounds and more particularly to a quasi-ionic polymerization process in which polar compounds having a C=C double bond in the alpha-position to a carbonyl or nitrile group is polymerized in the presence of compounds of silicon, germanium or tin as initiators together with nucleophilic or electrophilic catalysts.

BACKGROUND OF THE INVENTION

Generally, polymeric acrylic acid derivatives are formed by free-radical polymerization, using initiators which form free radicals and when two of the free radicals formed react with one another to cause chain termination, the polymerization is generally terminated. High molecular weight polymers having a very wide molecular weight distribution can be obtained by this method; however, block copolymers having a specified arrangement of the individual blocks cannot be produced in this manner.

Anionic polymerization of acrylic acid derivatives is described, for example, in U.S. Pat. No. 4,351,924 to Andrews et al, in which the polymerization is initiated by initiators which form anions, such as alkali metal-organic compounds instead of by free radicals. This type of polymerization leads to so-called "living" polymers having active terminal groups, because two ions having the same charge will not react to cause chain termination. Chain termination can be induced artificially, for example, by the addition of water or an alcohol. This process has the disadvantage that the desired narrow molecular weight distribution can be obtained only at low temperatures (down to $-80°$ C.) and with very pure starting materials.

The polymerization of acrylic acid derivatives, which is known as "quasi-ionic" polymerization is similar to anionic polymerization. In the quasi-ionic polymerization, the initial reaction is initiated by certain selected initiators together with nucleophilic or electrophilic catalysts to form "living" polymers. Selected initiators which are employed in the polymerization are silicon, tin and germanium compounds, in which the elements are linked to oxygen or carbon atoms, such as trimethylsilylketene acetals or trimethylsilyl cyanide. (See, for example, U.S. Pat. Nos. 4,414,372 to Farnham; 4,417,034 to Webster; 4,508,880 to Webster; and 4,524,196 to Farnham et al). This process can be carried out at room temperature or at higher temperatures, but it requires high purity starting materials, and in addition, forms polymers of the desired narrow molecular weight distribution only when methacrylic acid derivatives are employed.

When mercaptosilane type initiators are employed, "living" polymers of narrow molecular weight distribution are obtained under the conditions of quasi-ionic polymerization, even when acrylic acid derivatives are used as the monomers. (See, for example, U.S. Pat. No. 4,626,579 to Reetz).

Polymerization of acrylic ester monomers in the presence of a polymerization initiator comprising a tetracoordinate silicon-containing organic compound having at least one initiating site and a catalyst which is a source of fluoride, bifluoride or selected oxyanions is described in U.S. Pat. No. 4,771,117 to Citron et al. Citron discloses as initiators silanes, siloxanes and silazanes containing organic compounds having up to two silicon atoms per molecule.

According to the art, polymers having a narrow molecular weight distribution can be obtained by means of quasi-ionic polymerization of monomeric acrylic acid derivatives of any desired type using certain organosilicon compounds as initiators in conjunction with nucleophilic or electrophilic catalysts, but the average molecular weight of the polymers, are in general, relatively low.

It is, therefore, an object of the present invention to provide a process for polymerizing polar compounds which have a C=C double bond in the alpha-position to a carbonyl or nitrile group. Another object of the present invention is to provide a process for polymerizing polar compounds having a C=C double bond in the alpha-position to a carbonyl or nitrile group, in which the polymerization is initiated by organo-metallic compounds together with nucleophilic or electrophilic catalysts. Still another object of the present invention is to provide a process for polymerizing polar compounds having a C=C double bond in the alpha-position to a carbonyl or nitrile group using organo-metallic compounds and nucleophilic or electrophilic catalysts in the presence of an aprotic solvent. A further object of the present invention is to provide a process for polymerizing polar compounds having a C=C double bond in the alpha-position to a carbonyl or nitrile group at temperatures of from $-100°$ C. up to $100°$ C. A still further object of the present invention is to provide a process for polymerizing acrylic acid derivatives to form polymers having both a high average molecular weight and a narrow molecular weight distribution.

SUMMARY OF THE INVENTION

The foregoing objects and others which will become apparent from the following description are accomplished in accordance with this invention, generally speaking, by providing a process for polymerizing polar compounds having a C=C double bond in the alpha-position to a carbonyl or nitrile group in the presence of organo-metallic compounds as initiators, in which the initiators are selected from the group consisting of (I) cyclic silazanes, polymeric silazanes, which contain more than two silazanyl groups per molecule, cyclic siloxanes and polymeric siloxanes, which contain more than two siloxanyl groups per molecule and at least one Si-bonded H atom and silanes having at least one Si-bonded N atom in the form of secondary or tertiary amido groups, which can be substituted by organic radicals which can form a ring with the N atom or without the N atom, or at least one Si-bonded carbon atom in the form of alkynyl or cyclodienyl groups for each Si atom, and group (II) consisting of silanes having at least three silyl groups per molecule, germanes, stannanes, siloxanes, germoxanes and stannoxanes, which contain at least three silyl groups, germyl, stannyl, siloxanyl, germoxyl or stannoxyl groups per molecule, in which each metal atom has at least one hydrocarbyloxy group bonded thereto.

DESCRIPTION OF THE INVENTION

The invention relates to a process for polymerizing polar compounds which have a C=C double bond in the alpha-position to a carbonyl or nitrile group in the presence of organo-metallic compounds as initiators. Polar compounds which may be polymerized in the presence of organo-metallic compounds as initiators are acrylic acid derivatives such as esters, nitriles and amides of acrylic acid and methacrylic acid.

Among the organo-metallic compounds used as initiators selected from group (I) are silanes having at least one Si-bonded N atom in the form of secondary or tertiary amido groups or silanes having at least one Si-bonded carbon atom in the form of alkynyl or cyclodienyl groups for each Si atom, in which the preferred silanes have the general formula $$R_{4-n}SiX_n \quad (1)$$

where R represents alkyl, cycloalkyl, alkenyl, aryl, alkaryl or aralkyl radicals and X represents radicals of the formulas

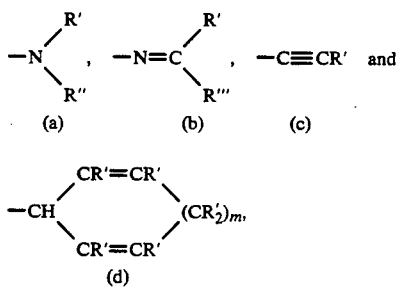

where R' represents H atoms or R radicals, R" represents radicals of the formulas —COOR or —COR, R'" represents alkyl, aryl, alkaryl or aralkyl radicals or radicals of the formulas —OR, —OCOR, —NHCOR, —CONHR, —NHCOOR or —NHR, in which R' may form a 4- to 13-membered ring with R" or R'", and R" or R'" may be oxygen atoms, in which the unsatisfied valence is linked to another silyl group, and when X is a radical of formulas (a), (b), (c) or (d) then n is 1 or 2 and m is 0, 1, 2 or 3.

The preferred silazanes are linear compounds or ring compounds having at least three units of the general formula

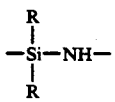

(2)

in which R is the same as above and the remaining valences of the Si atoms are saturated by R radicals or are linked to the NH group of a silazane having more than two units of formula (2).

The preferred siloxanes are linear compounds or ring compounds having at least three units of the general formula

(3)

in which R is the same as above and the remaining valences of the Si atoms are saturated by R radicals or are linked to the oxygen atom of a siloxane having at least one unit of formula (3) or units of the general formula

(3')

Examples of radicals represented by R in the silanes, silazanes or siloxanes which can be the same or different, are alkyl radicals having from 1 to 18 carbon atoms, preferably from 1 to 4 carbon atoms, which can be straight-chain or branched, such as methyl, ethyl, n-propyl, iso-propyl and n-butyl radicals, cycloalkyl radicals, such as cyclopentyl and cyclohexyl radicals, alkenyl radicals having from 2 to 18 carbon atoms, preferably from 2 to 4 carbon atoms, such as vinyl and allyl radicals, aryl radicals such as the phenyl and naphthyl radicals, alkaryl radicals such as the tolyl and xylyl radicals, and aralkyl radicals such as the benzyl radical. Because of their availability, methyl, ethyl, vinyl and phenyl radicals are the preferred radicals, with the methyl radical being the more preferred R radical.

The silanes, used in accordance with this invention, having the formula shown in formula (1) can, for example, be silanes having Si-bonded secondary or tertiary Si-bonded amino carboxylate ester or aminocarboxamide groups, such as ethyl N-trimethylsilylaminoacetate, ethyl N-trimethylsilyl-11-amino-undecanoate, ethyl N-trimethylsilyl-4-aminobenzoate and N-trimethylsilylaminoacetic acid diethylamide; silanes having an Si-bonded N atom which is part of a preferably 5 to 7-membered heterocyclic ring, such as N-trimethylsilyl-morpholine, 3-(trimethylsilyl)-2 oxazolidinone, N-trimethylsilyl-butyrolactam, N-trimethylsilyl-caprolactam, N-trimethylsilyl-thiazolidine, in which it is possible for two silyl groups to be present, such as in 1,4-bis-(trimethylsilyl)-piperazine-2,5-dione; silanes having an Si-bonded N atom originating from a carbamic acid ester or an acid amide, such as ethyl N-trimethylsilyl-carbamate and N-trimethylsilyl-acetamide, in which it is possible for two silyl groups to be present, as in N,O-bis-(trimethylsilyl)-acetamide, which exists in the following tautomeric forms:

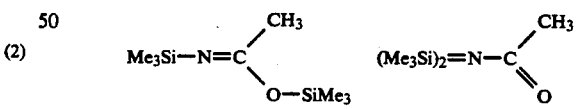

Other examples of silanes are those having Si-bonded alkynyl or cyclodienyl groups, such as bis-(trimethylsilyl)-acetylene, 1-trimethylsilyl-1-propyne, 1-trimethylsilyl-1-octyne and trimethylsilyl-cyclopentadiene.

The silazanes used in accordance with this invention having units shown in formula (2) can, for example, be cyclic silazanes, such as hexamethylcyclotrisilazane and octamethyl-cyclotetrasilazane, or polymeric silazanes, such as polydimethylsilazane and polymethyl-phenylsilazane.

The siloxanes used in accordance with this invention consisting of units shown in formula (3) and, if desired units shown in formula (3') can, for example, be linear-chain siloxanes such as cyclic siloxanes, for example, methyl-H-cyclotrisiloxane, methyl-H-cyclotetrasiloxane, methyl-H-cyclooctasiloxane and tri-(methyl-H)-dimethylcyclotetrasiloxane, or polymeric siloxanes, such as poly-methyl-H-siloxane and poly-methylphenyl-H-siloxane, in which the H atoms can be in the terminal unit or arranged along the chain.

The organo-metallic compounds which can be used as initiators and are selected from group (II) are silanes having at least three silyl groups per molecule, siloxanes and the corresponding germanium and tin compounds. Preferably, the germanes, stannanes, monogermanes or monostannanes have the gereral formula

 (4)

and the di-compounds and poly-compounds have the general formula

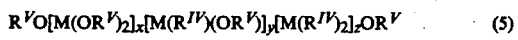 (5)

where M is Si, Ge or Sn; $R^{IV}$ is H atoms or alkyl, cycloalkyl, alkenyl, aryl, aralkyl or alkaryl radicals which may be substituted by fluorine, chlorine, alkoxy and/or acyloxy groups; $R^V$ is alkyl, cycloalkyl, aryl, aralkyl, alkaryl or alkenyl radicals, with the proviso that the oxygen atom must be bonded to an sp$^3$-hybridized carbon atom of the alkenyl radical; p is 1, 2 or 3; and x, y and z have values of from 0 to 500 and the sum of x+y+z must be at least 2.

The preferred siloxanes are those having units of the general formula

 (6)

or the corresponding germanium and tin compounds, in which $R^{IV}$ and $R^V$ are the same as above, c is 0, 1, 2 or 3, preferably an average of from 0.01 to 2.5, e is 0, 1, 2 or 3, preferably an average of from 0.1 to 2.5 and the sum of c +e is at most 3 per unit.

Examples of radicals represented by $R^{IV}$, which can be the same or different, in the silanes having at least three silyl groups, siloxanes, germanes, germoxanes, stannanes or stannoxanes are alkyl radicals which have from 1 to 18 carbon atoms, preferably from 1 to 4 carbon atoms, and can be straight-chain or branched, are the methyl, ethyl, n-propyl, iso-propyl and n-butyl radicals, cycloalkyl radicals such as the cyclopentyl and cyclohexyl radicals, alkenyl radicals having from 2 to 18 carbon atoms, preferably from 2 to 4 carbon atoms, such as the vinyl and allyl radicals, aryl radicals such as the phenyl and naphthyl radicals, alkaryl radicals such as tolyl and xylyl radicals, and aralkyl radicals such as the benzyl radical. Because of their availability, methyl, ethyl, vinyl and phenyl are the preferred radicals, with methyl being the most preferred radical represented by $R^{IV}$.

Examples of radicals represented by $R^V$ are the same as those mentioned for $R^{IV}$, except for the alkenyl radicals in which the oxygen atom must be bonded to an sp$^3$-hybridized carbon atom thereof; i.e., that there must be at least one carbon atom without a double bond between the metallic-bonded oxygen atom and the C=C double bond of the alkenyl radical. Thus, vinyl radicals are excluded as examples of $R^V$ radicals.

Examples of metallic organic compounds which can be used in accordance with this invention are, for example, methoxytributyltin and methoxytrimethyltin.

Examples of siloxanes are solvent-free, low-viscosity alkyl esters of oligomeric alkylsilicic acids, such as those having units of the average formula $CH_3Si(O)_{1.1}(OCH_3)_{0.8}$ and having a viscosity of about 30 mm$^2$ per second. In general, the initiating capacity of the silanes and siloxanes increases in the following order:

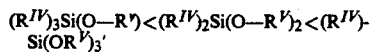

and with decreasing size of the radical O—RV:

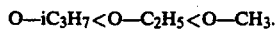

The organo-metallic compounds used in accordance with this invention as initiators are either commercially available products, or they can be prepared in a manner known in the art.

For carrying out the polymerization process, the organo-metallic compounds used in accordance with this invention are employed together with nucleophilic or electrophilic catalysts. Examples of such catalysts are zinc iodide, bromide, and chloride, mono- and dialkylaluminum halides, dialkylaluminum oxides, tris(-dimethylamino)sulfonium difluorotrimethylsilicate, tris(dimethylamino)sulfonium cyanide, tetraphenylarsonium cyanide, tris(dimethylamino)sulfonium azide, tetraethylammonium azide, bis(dialkylaluminum)oxides, boron trifluoride etherate, alkali metal fluorides, alkali metal cyanides, alkali metal azides, tris(dimethylamino)sulfonium difluorotriphenylstannate, tetrabutylammonium fluoride, tetramethylammonium fluoride, and tetraethylammonium cyanide. Preferred catalysts include sources of fluoride ions, especially tris(-dimethylamino)sulfonium difluorotrimethylsilicate and tetrabutylammonium fluoride; tetraalkylammonium cyanides; zinc bromide, and zinc chloride. Other catalysts include bifluoride ions, such as, for example, tris(-dimethylamino)sulfonium bifluoride, tetraalkylammonium bifluorides, tetraarylphosphonium bifluorides, bifluorides of the alkali metals, especially potassium and ammonium bifluoride. Tris(dimethylamino)sulfonium bifluoride may be prepared by reacting tris(dimethylamino)sulfonium difluorotrimethylsilicate with water or a lower alkanol, for example, methanol. Tetrabutylammonium fluoride and tetrabutylammonium cyanide are the preferred catalysts.

The molar ratio of initiator to catalyst is usually in the range of from 1000 to 0.1:1, preferably in the range of from 100 to 10:1 and more preferable in the range of from 50 to 1:1.

The polymerization process can, depending on the type of initiator, be carried out at temperatures in the range of from $-100°$ C. to $+100°$ C., preferably in the range of from $-20°$ to $+50°$ C. and more preferably in the range of from $+10°$ C. to $+40°$ C. It is important that the process be carried out in the absence of moisture. This can usually be accomplished by using an inert gas atmosphere, such as argon or nitrogen, or dry air. The polymerization can be carried out in the absence or presence of an aprotic solvent, and as a continuous or discontinuous solution polymerization, precipitation polymerization, suspension polymerization or emulsion polymerization. The solvents selected are preferably those in which the monomers and the initiator and catalyst are sufficiently soluble at the intended reaction temperature. Examples of such aprotic solvents are methyl acetate, ethyl acetate, butyl acetate, acetonitrile, toluene, xylene, N,N-dimethylformamide, N-methylpyrrolidone, tetrahydrofuran, tert-butyl methyl ether and silicone oils, such as polydimethylsiloxane fluids and polymethylphenylsiloxane fluids having viscosities in the range of from about 5 to 500 mPa.s at 25° C.

The monomers which can be polymerized are derivatives of acrylic acid, such as esters, amides and nitriles of acrylic acid and methacrylic acid. Specific examples of acrylic acid esters, are N-butyl acrylate and 2-ethylhexyl acrylate, methacrylic acid esters such as methyl methacrylate, ethyl methacrylate, n-butyl methacrylate, cyclohexyl methacrylate, dodecyl methacrylate and tetradecyl methacrylate.

The polymerization process can be carried out as a continuous or discontinuous process in a manner known in the art. The initiator and catalyst are initially introduced, and the monomers are added at a controlled rate in the presence or absence of a solvent with good mechanical agitation so that the monomers are distributed throughout the polymerization mixture with cooling, when necessary, so that the exothermic reaction does not exceed the intended temperature of the reaction.

When the added monomers have been consumed, the polymerization reaction stops. However, "living" polymers are still present in the reaction vessel, and these are still active even after the monomers have been consumed. These "living" polymers can be further polymerized in a known manner by adding other monomers to give block copolymers or can be converted into inactive polymers by the addition of chain stopping reagents or so-called coupling agents, such as described in, for example, U.S. Pat. No. 4,417,034 to Webster.

By using the initiators of this invention, it is not only possible to polymerize acrylic acid derivatives of any desired type quasi-ionically over a broad temperature range, but the resulting polymers of predominantly syndiotactic structure are distinguished by having a high molecular weight and a narrow molecular weight distribution.

The invention is further illustrated by the following examples. The polymerization reactions in the following examples were always conducted under an atmosphere of argon or in the presence of dry air, unless otherwise specified. The solvents used were dried by known methods, and the monomers were purified by filtration over alumina.

The anhydrous solution of tetrabutylammonium fluoride in tetrahydrofuran or toluene was prepared in a known manner by means of calcium hydride. The polymeric end products were characterized by NMR spectroscopy ($^1$-H-NMR) and/or gel permeation chromatography (GPC). Silanes and siloxanes rom industrial production were used directly, without additional purification. The chain structure of the polymers obtained was syndiotactic to the extent of 60 to 70 percent as shown by NMR. The average molecular weight $\overline{M}_n$ was determined by the GPC.

EXAMPLE 1

About 0.2 mmol (2 ml of a 0.1 M solution in toluene) of tetrabutylammonium fluoride and then 10 g (59.5 mmol) of cyclohexyl methacrylate were added to a solution containing 1 ml of polymethylhydrogensiloxane in 100 ml of anhydrous toluene. After the highly exothermic reaction had started, an additional 74.1 g (440.5 mmol) of cyclohexyl methacrylate were added with cooling at a rate such that the reaction temperature did not exceed 35° C. After the exothermic reaction was complete, the viscous mass was allowed to stand for an additional 3 hours at room temperature. The product was then dried in vacuo. Yield: 85 g (quantitative); melting point: 240°-260° C.; GPC: $\overline{M}_n$ 1,400,000.

EXAMPLE 2

About 50 g (500 mmol) of methyl methacrylate were introduced with cooling into a solution containing 1.02 g (5.0 mmol) of N,O-bis-(trimethylsilyl)-acetamide and 0.2 mmol (2 ml of a 0.1 M solution in toluene) of tetrabutylammonium fluoride in 70 ml of anhydrous toluene at such a rate that the reaction temperature did not exceed +10° C. After stirring for an additional 3 hours at room temperature, the solvent was removed in vacuo. Yield: 25 g (50 Percent); melting point: 115° C.; GPC: $\overline{M}_n$ 37,000.

EXAMPLE 3

The following experiment was carried out under dry air:

About 203 mg (1 mmol) of N,O-bis-(trimethylsilyl)acetamide and 0.1 mmol (1 ml of a 0.1 M solution in tetrahydrofuran) of tetrabutylammonium fluoride were introduced into 12.8 g (100 mmol) of n-butyl acrylate. A highly exothermic reaction occurred immediately. This gave a quantitative yield of a highly viscous polymer, in which the monomer content was 1 percent (detected by NMR). GPC: $\overline{M}_n$ 10,800.

EXAMPLE 4

About 64 g (500 mmol) of n-butyl acrylate were introduced into a cooled solution containing 813 mg (4 mmol) of N,O-bis-(trimethylsilyl)-acetamide and 0.1 mmol (1 ml of a 0.1 M solution in tetrahydrofuran) in 100 ml of anhydrous toluene at such a rate that the temperature did not exceed +5° C. After the addition was complete, the mixture was warmed to room temperature. About 40 g of a viscous tacky polymer were obtained after removing the solvent in vacuo. GPC: $\overline{M}_n$ 65,000.

EXAMPLE 5

About 0.1 mmol (1 ml of a 0.1 M solution in toluene) of tetrabutylammonium fluoride was added with stirring to a solution containing 64 g (500 mmol) of n-butyl acrylate and 657 mg (3 mmol) of hexamethylcyclotrisilazane in 100 ml of anhydrous toluene. A slight exotherm was observed in which the temperature of the reaction mixture increased to 31.5° C. over a period of 45 minutes. After 20 hours, the solvent was removed, and the product was dried in a high vacuum. This gave 49.6 g of a highly viscous oil. GPC: $\overline{M}_n$ 65,000.

EXAMPLES 6 to 10

In each of these Examples, 5 ml of initiator and 0.2 ml of catalyst in 100 ml of solvent were initially introduced, and 500 mmol of monomers. The reaction temperature was maintained between +20° and +30° C. by cooling. After the exothermic reaction had subsided, the mixtures were stirred for an additional 4 hours at room temperature. All the polymerizations were carried out under argon. The resulting products were dried at 60° C. in a high vacuum. The starting materials used and the results are summarized in the following table.

| Example | Monomer | Initiator | Catalyst | LM**) | Yield (Percent) | $\overline{M}_n$(GPC) |
|---|---|---|---|---|---|---|
| 6 | n-Butyl acrylate | 3-Trimethylsilyl-2-oxazolidinone | Bu₄NF**) | Toluene | 98 | 24,400 |
| 7 | n-Butyl acrylate | N-Trimethylsilyl-acetamide | Bu₄NF*) | Toluene | 94 | 25,900 |
| 8 | 2-Ethylhexyl acrylate | 3-Trimethylsilyl-2-oxazolidinone | Bu₄NF*) | Toluene | 98 | 50,000 |
| 9 | Ethyl methacrylate | 3-trimethylsilyl-2-oxazolidinone | Bu₄NF*) | THF***) | 100 | 220,000 |
| 10 | Methacrylate | Bis-(trimethylsily)acetylene | Bu₄NF*) | THF***) | 86 | 17,900 |

*)Bu₄NF = Tetrabutylammonium fluoride
**)LM = Solvent
***)THF = Tetrahydrofuran

EXAMPLE 11

About 64 g (500 mmol) of n-butyl acrylate were introduced over a period of about 30 minutes with stirring and cooling into a solution containing 2 g of a siloxane consisting of units of the average formula $CH_3Si(O)_{1.1}(OCH_3)_{0.8}$ and having a viscosity of 30 mm².s⁻¹ dissolved in 100 ml of anhydrous toluene as the initiator and 0.25 mmol of tetrabutylammonium fluoride (1 ml of 0.25 M solution in tetrahydrofuran) as the catalyst at such a rate, that the reaction temperature did not exceed 40° C. After the exothermic reaction had subsided, the mixture was stirred for an additional 4 hours at room temperature. The solvent was then removed in vacuo, and the product was dried at 60° C. in a high vacuum. Yield: 56.8 g (86 percent of theory); viscous product; GPC: $\overline{M}_n$ 22,000

EXAMPLE 12

The procedure of Example 11 was repeated, except that 64 g (500 mmol) of n-butyl acrylate were polymerized with 1.6 g (5 mmol) of methoxytributyltin as the initiator, dissolved in 150 ml of anhydrous tert-butyl methyl ether, and 0.25 mmol of tetrabutylammonium fluoride (1 ml of a 0.25 M solution in tetrahydrofuran) as the catalyst. Yield: 32 g (50 percent of theory); viscous oil; GPC: $\overline{M}_n$ 6,500.

EXAMPLE 13

The procedure of Example 11 was repeated, except that 60 g (500 mmol) of tert-butyl acrylate were polymerized with 1.6 g (5 mmol) of methoxytributyltin as the initiator, dissolved in 90 ml of anhydrous tert-butyl methyl ether, and 0.25 mmol of tetrabutylammonium fluoride (1 ml of a 0.25 M solution in tetrahydrofuran) as the catalyst. Yield: 55.7 g (66 percent of theory); melting point: 90° C.; GPC: $\overline{M}_n$ 37,500.

EXAMPLE 14

The procedure of Example 11 was repeated, except that 64 g (500 mmol) of tert-butyl acrylate were polymerized with 1.6 g (5 mmol) of methoxytributyltin as the initiator, dissolved in 100 ml of anhydrous toluene, and 0.25 mmol of tetrabutylammonium fluoride (1 ml of a 0.25 M solution in tetrahydrofuran) as the catalyst. Yield: 64 g (quantitative); melting point: 94°–96° C.

What is claimed is:

1. A process for polymerizing polar compounds which have a C═C double bond in the alpha-position to a carbonyl or nitrile group, which comprises polymerizing the polar compounds in the presence of initiators selected from the group consisting of organo-metallic compounds of silicon, germanium and tin with nucleophilic or electrophilic catalysts at temperatures in the range of from −100° C. to +100° C., in which the organo-metallic compounds are selected from the group consisting of (a) cyclic silazanes,
(b) polymeric silazanes which contain at least three silazanyl units of the formula

in which R is selected from the group consisting of alkyl, cycloalkyl, alkenyl, aryl, alkaryl, and aralkyl radicals, and the remaining valences of the Si atoms are saturated by radicals represented by R or are linked to NH groups of another units of formula (2) per molecule,
(c) cyclic siloxanes,
(d) polymeric siloxanes which contain at least three siloxanyl units of the formula

in which R is selected from the group consisting of alkyl, cycloalkyl, alkenyl, aryl, alkaryl and aralkyl radicals and the remaining valences of the Si atoms are saturated by R radicals or are linked to an oxygen atom of another siloxane unit of formula (3) or a unit of the formula

per molecule, where R is selected from the group consisting of alkyl, cycloalkyl, alkenyl, aryl, alkaryl, and aralkyl radicals,
(e) silanes of the formula

where R is selected from the group consisting of alkyl, cycloalkyl, alkenyl, aryl, alkaryl and aralkyl radicals, X is selected from the group consisting of radicals of the formulas

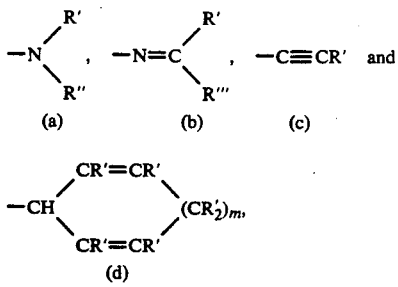

where R' is selected from the group consisting of H atoms and R radicals, R" is selected from the group consisting of radicals of the formulas —COOR, —COR and an oxygen atom in which the unsatisfied valence is satisfied by another silyl group, R''' is selected from the group consisting of radicals of the formulas —OR, —OCOR, —NHCOR, —CONHR, —NHCOOR, NHR, and an oxygen atom in which the unsatisfied valence is satisfied by another silyl group, n is 1 or 2 and m is 0, 1, 2 or 3, (f) silanes having at least three silyl groups per molecule of the formula

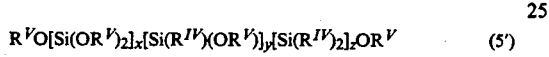

wherein $R^{IV}$ is selected from the group consisting of H atoms, alkyl, cycloalkyl, alkenyl, aryl, aralkyl and alkaryl radicals which may be substituted by radicals selected from the group consisting of fluorine, chlorine, alkoxy and acyloxy group, $R^V$ is selected from the group consisting of alkyl, cycloalkyl, aryl, aralkyl, alkaryl and alkenyl radicals with the proviso that the oxygen atoms must be bonded to an sp³-hybridized carbon atom of the alkenyl radical, x, y and z have values of from 0 to 500 and the sum of x+y+z must be at least 2 with the proviso that at least one hydrocarbyloxy group is bonded to each silicon atom, (g) siloxanes having units of the formula

in which $R^{IV}$ is selected from the group consisting of H atoms, alkyl, cycloalkyl, alkenyl, aryl, aralkyl and alkaryl radicals which may be substituted by radicals selected from the group consisting of fluorine, chlorine, alkoxy and acyloxy groups, $R^V$ is selected from the group consisting of alkyl, cycloalkyl, aryl, aralkyl, alkaryl and alkenyl radicals, with the proviso that the oxygen atom must be bonded to an sp³-hybridized carbon atom of the alkenyl radical, c is 0, 1, 2 or 3, with an average of from 0.1 to 2.5, e is 0, 1, 2 or 3, with an average of from 0.1 to 2.5, and the sum of c+e is at most 3 per unit with the proviso that at least one hydrocarbyloxy group is bonded to each silicon atom, (h) compound of the formula

where M is selected from the group consisting of Ge and Sn $R^{IV}$ is selected from the group consisting of H atoms, alkyl, cycloalkyl, alkenyl, aryl, aralkyl and alkaryl radicals which may be substituted by radicals selected from the group consisting of fluorine, chlorine, alkoxy and acyloxy groups, $R^V$ is selected from group consisting of alkyl, cyclalkyl, aryl, aralkyl, alkaryl and alkenyl radicals with the proviso that the oxygen atoms must be bonded to an sp³-hydribrized carbon atom of the alkenyl radical, p is 1, 2 or 3, with the proviso that at least one hydrocarbyloxy group is bonded to each M, (i) compounds of the formula

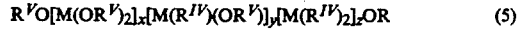

where M is selected from the group consisting of Ge and Sn, $R^{IV}$ is selected from the group consisting of H atoms, alkyl, cycloalkyl, alkenyl, aryl, aralkyl and alkaryl radicals which may be substituted by radicals selected from the group consisting of fluorine, chlorine, alkoxy and acyloxy groups, $R^V$ is selected from the group consisting of alkyl, cycloalkyl, aryl, aralkyl, alkaryl and alkenyl radicals with the proviso that the oxygen atoms must be bonded to an sp³-hybridized carbon atom of the alkenyl radical, x, y and z each have values of from 0 to 500, with the proviso that the sum of x+y+z must be at least 2 with the proviso that at least one hydrocarbyloxy group is bonded to each M, (j) germanium compounds which correspond to the siloxanes of formula (6) and (k) stannoxane compounds which correspond to the siloxanes of formula (6)

2. The process of claim 1, wherein the polymeric silazanes are linear compounds having at least three units of the formula

in which R is selected from the group consisting of alkyl, cycloalkyl, alkenyl, aryl, alkaryl, and aralkyl radical, and the remaining valences of the Si atoms, are saturated by radicals represented by R or are linked to NH groups of another unit of formula (2).

3. The process of claim 1, wherein the polymeric siloxanes are linear compounds having at least three units of the formula

in which R is selected from the group consisting of alkyl, cycloalkyl, alkenyl, aryl, alkaryl and aralkyl radicals and the remaining valences of the Si atoms are saturated by R radicals or are linked to an oxygen atom of another siloxane unit of formula (3) or unit of formula

where R is the same as above.

4. The process of claim 1, wherein the polymerization is conducted in the presence of an aprotic solvent.

* * * * *